United States Patent [19]

Beever

[11] Patent Number: 4,588,765

[45] Date of Patent: May 13, 1986

[54] IMPACT POLYAMIDE COMPOSITION CONTAINING GRAFTED NITROGEN COMPOUND

[75] Inventor: William H. Beever, Bartlesville, Okla.

[73] Assignee: Phillips Petroleum Company, Bartlesville, Okla.

[21] Appl. No.: 685,412

[22] Filed: Dec. 24, 1984

[51] Int. Cl.$^4$ ............................................. C08K 5/52
[52] U.S. Cl. ..................... 524/140; 524/147; 524/151; 524/153; 524/504; 524/505; 525/66; 525/92; 525/184
[58] Field of Search ............... 524/140, 147, 151, 153, 524/504, 505; 525/66, 92, 184

[56] References Cited

U.S. PATENT DOCUMENTS

| | | | |
|---|---|---|---|
| 3,554,911 | 1/1971 | Schiff et al. | 252/59 |
| 4,041,103 | 8/1977 | Davison et al. | 525/92 |
| 4,119,607 | 10/1978 | Gergen et al. | 525/92 |
| 4,129,553 | 12/1978 | Haberlein et al. | 524/147 |
| 4,145,298 | 3/1979 | Trepka | 252/51.5 A |
| 4,174,358 | 11/1979 | Epstein | 525/183 |
| 4,221,879 | 9/1980 | Humme et al. | 525/66 |
| 4,242,470 | 12/1980 | Gergen et al. | 525/92 |
| 4,321,218 | 3/1982 | Rasberger et al. | 524/151 |
| 4,381,371 | 4/1983 | Nielinger et al. | 525/66 |
| 4,390,667 | 6/1983 | Aharoni et al. | 524/140 |
| 4,427,828 | 1/1984 | Hergenrother et al. | 525/92 |
| 4,436,865 | 3/1984 | Beever | 525/505 |
| 4,496,690 | 1/1985 | Grant et al. | 525/66 |

*Primary Examiner*—John Kight
*Assistant Examiner*—Kriellion Morgan
*Attorney, Agent, or Firm*—A. W. Umphlett

[57] ABSTRACT

An impact polyamide composition is provided by incorporating a nitrogen-containing conjugated diene/-monovinyl-substituted aromatic compound copolymer with the polyamide. The resulting composition has greatly enhanced impact characteristics. In a further embodiment an organic phosphite or phosphonate is incorporated in addition which has the effect of dramatically reducing notch sensitivity of the resulting composition.

19 Claims, No Drawings

IMPACT POLYAMIDE COMPOSITION CONTAINING GRAFTED NITROGEN COMPOUND

BACKGROUND OF THE INVENTION

This invention relates to impact polyamide compositions.

A great many potentially useful thermoplastic molding compounds suffer from the disadvantage of being relatively brittle. Polyamides such as nylon, for instance, are ideally suited for many applications because of their strength, rigidity, and other physical and chemical properties. However, polyamides, too, suffer from relatively low impact resistance. Efforts have been made with varying degrees of success to improve the impact strength of relatively rigid, brittle thermoplastic materials by blending therewith a rubbery component. However, as likely as not, such blends result in weak compositions as evidenced by low tensile strength. Copolymers of monovinyl-substituted aromatic compounds and conjugated dienes which have been grafted with an organic nitrogen compound are disclosed in U.S. Pat. No. 4,436,865 as being useful to improve tensile strength and also to effect modest improvements in impact strength of poly(arylene sulfide). The ability to effect even a modest improvement of impact strength with an increase rather than a decrease in tensile runs counter to what more generally occurs in these situations.

SUMMARY OF THE INVENTION

It is an object of this invention to provide an impact grade polyamide; and it is a further object of this invention to provide an impact resistant polyamide which exhibits low notch sensitivity.

In accordance with this invention, a thermoplastic composition is provided comprising a normally solid polyamide and a conjugated diene/monovinyl-substituted aromatic compound copolymer grafted with an organic nitrogen compound. In a more specific embodiment the composition further contains an organic phosphite or phosphonate.

DESCRIPTION OF THE PREFERRED EMBODIMENTS

The polyamide can be any normally solid thermoplastic polyamide. Such compositions are well-known in the art under the generic designation of nylon for instance. Nonlimiting examples include Nylon 66 and Nylon 6 and also the polyamides disclosed in U.S. Pat. No. 4,028,476.

The nitrogen-containing copolymers useful in this invention are those described in U.S. Pat. No. 4,145,298 the disclosure of which is hereby incorporated by reference. They are described as oil-soluble organonitrogen compound grafted hydrogenated conjugated diene/monovinylarene copolymers with the copolymers having (1) a polymerized monovinylarene content of about 20 to 70 weight percent with the proviso that when the copolymer contains a random block, the block polymonovinylarene content is in the range of about 15 to 35 weight percent, (2) a number average molecular weight suitable for oil solubility, (3) an extent of hydrogenation of the copolymers such that about at least 95 weight percent of olefinic double bonds having been saturated and (4) less than about 5 weight percent of aromatic double bonds having been saturated. The copolymers are characterized as having been prepared by the process which comprises metalating a hydrogenated conjugated diene hydrocarbon/monovinylarene hydrocarbon copolymer, and reacting the resulting metalated hydrogenated copolymer with effective amounts of at least one nitrogen-containing organic compound. The nitrogen-containing organic compounds suitable for use in this reaction can be described by the general formulae $X-Q-(NR_2^3)_n$ or $Y[Q-(NR_2^3)_2]$ wherein each $R_2^3$ is the same or different alkyl, cyloalkyl, or aryl radicals, or combination thereof; and Q is a hydrocarbon radical having a valence of $n+1$ and is a saturated aliphatic, saturated cycloaliphatic, or aromatic radical, or combination thereof, X is a functional group capable of reacting on a one-to-one basis with one equivalent of polymer lithium. Nonlimiting examples of X include such as:

wherein $R^4$ is hydrogen, or an alkyl, cycloalkyl, or aryl radical or combination radical; $N\equiv C-$; $R^3N=HC-$;

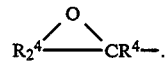

Y is or contains a functional group capable of reacting on a one-to-one basis with one equivalent of polymer lithium, such as a keto group or other similar group derived from or containing functional groups defined as X above. The n can be one or greater with the proviso that the value of n should preferably not exceed that which causes the nitrogen compound or the resulting modified polymer to be hydrocarbon insoluble; and m is 2 or 3. There is no known limit on the number of carbon atoms of any of $R^3$ or $R^4$ as far as operability is concerned. Nonlimiting examples of suitable nitrogen compounds include:

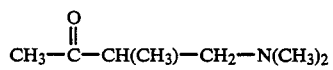

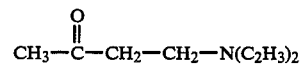

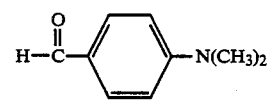

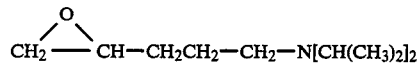

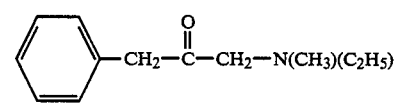

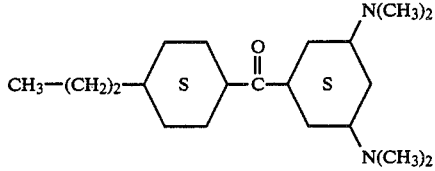

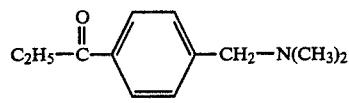

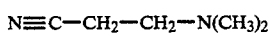

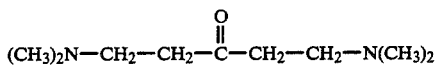

The most preferred material is N,N-dimethylbenzaldehyde or hydrocarbon substituted derivatives thereof.

The nitrogen-containing copolymer can be utilized alone or a mixture of the nitrogen-containing copolymer and another otherwise similar copolymer except containing no nitrogen compound grafted thereto can be utilized. It has been found that there is a threshold as to the amount of copolymer which is required to effect any noticeable improvement in the impact. However if a mixture of the nitrogen-containing and nitrogen-free compositions is used a much smaller amount of the nitrogen-containing material is effective although the total amount of the copolymer used in such instances will be slightly more than that used when the nitrogen-containing copolymer is used alone. Nevertheless because of the lower cost of the nitrogen-free component the mixtures offer a substantially economical advantage with no significant sacrifice in the properties.

At least 15 weight percent, more preferably at least 20 weight percent copolymer is required when the nitrogen-containing copolymer is utilized alone. There is really no upper limit on how much can be utilized although it is readily apparent that excessive amounts would result in a more expensive product and one with an unnecessary sacrifice in other physical properties such as flexural modulus. Furthermore, the benefit from the presence of the rubber after the threshold level has been reached occurs very rapidly with little additional benefit on use of higher amounts. Consequently, a maximum amount of 30 weight percent, more preferably 25 weight percent, is generally to be used. Weight percentages are based on the weight of the total composition, i.e. a 20 weight percent composition would be one with 80 percent nylon and 20 percent copolymer.

If a mixture of nitrogen-containing copolymer and nitrogen-free copolymer are used, then the nitrogen-containing copolymer must be used in an amount such that the weight fraction of grafted copolymer times the weight percentage of nitrogen content equals at least 0.005, preferably at least 0.01 weight percent nitrogen based on the total weight of the composition including nylon and copolymer. For instance, as little as 5 percent of a nitrogen-containing copolymer having a nitrogen content of 0.1 weight percent could be utilized. In such instances, however, there must be present at least 20 weight percent copolymer including both the nitrogen-containing and the nitrogen-free copolymers. The upper limit in such instances is 50 weight percent.

The nitrogen content of the nitrogen-containing copolymer can vary from 0.1 to 5 weight percent but is generally in the range of 0.05 to 0.5 weight percent.

The polyamide and copolymer or copolymers are blended in any manner known in the art for melt blending such as with a Banbury or mixing extruder. Alternatively the ingredients of the composition can be dry milled. Because thermoplastic polyamides are relatively high melting and because degradation apparently occurs at high temperatures there is a relatively narrow temperature range for mixing and forming. The maximum mixing temperature generally is in the neighborhood of 288° C. (550° F.). The same temperature represents the maximum temperature preferred for extrusion molding. An even lower maximum temperature of about 282° C. (540° F.) is desired for injection molding. The minimum temperature is that well known in the art for a particular polyamide being utilized. Generally the lowest temperature suitable for mixing and fabricating is about 271° C. (520° F.).

It has been found, surprisingly, that two classes of thermostabilizers, organic phosphites and organic phosphonates in combination with the nitrogen-containing copolymers results in remarkable reduction in notch sensitivity. This matter is not understood since these particular stabilizers, while being good stabilizers, are not the very best stabilizers available and hence it is not simply a function of better stabilization.

In any event, in the most preferred embodiments the composition also contains from 0.1 to 10 preferably from 1 to 3 weight percent based on the weight of the composition of an organic phosphite or phosphonate. It has been found that some phosphonates and phosphites are not particularly effective in this regard and no correlation has been determined for distinguishing which ones are less effective. However since most are effective and it clearly involves a simple test to determine if a particular phosphite or phosphonate is effective the invention is broadly applicable to the organic phosphites and phosphonates. Examples of specific suitable compounds include dialkylphosphites such as dimethylphosphite, dibutylphosphite, diisooctylphosphite, bistridecylphosphite, and dioleylphosphite. Examples of suitable trialkylphosphites include trimethylphosphite, tributylphosphite, tris-(2-chloroethyl)phosphite, triisopropylphosphite, triisooctylphosphite, triisodecylphosphite, trilaurylphosphite, and tristearylphosphite. Suitable aryl-alkyl phosphites include diphenylisooctylphosphite, diphenylisodecylphosphite, and phenyldiisodecylphosphite. Suitable arylphosphite is tris-(nonylphenyl)phosphite. Suitable cyclic phosphite is distearyl pentaerythritol diphosphite. Also suitable are polymeric phosphites such as Olin Corporation's Wytox ® 345. Suitable phosphonates include dimethylmethylphosphonate, dibutylphosphonate and cyclicphosphonates such as Antiblaze ® 19.

The compositions of this invention can contain other conventional additives as is well known in the art such as fillers, pigments, other antioxidants and UV stabilizers, glass fibers, fillers, and other conventional additives.

EXAMPLE I

This Example describes the procedure used for preparing and evaluating the samples herein described. A typical method of preparation is as follows: 100(200)

grams copolymer, 900(800) grams dry nylon pellets and 1.0(2.0) grams (amount equivalent to 1% of copolymer additive) of a thermostabilizer such as Irganox 1035 or 1098 available from Ciba-Geigy Corporation are tumble mixed for 5 minutes in a plastic bag. Each mixture is extruded through a Davis Standard extruder at 550° F. (288° C.), pelletized, dried at 100° F. (37.8° C.) overnight in a vacuum oven, and molded into ASTM Type IV tensile and ⅛" impact bars using an Arburg molding machine model 221E/170R. Mechanical properties are measured on the "as molded" bars using an Instron 1125 Static tester and a TMI Izod impact tester. The tensile bars are 0.063 inch and the impact bars 0.125 inch.

TABLE I

EFFECT OF ADDITIVES ON IMPACT PROPERTIES OF NYLON 66

| Composition | Izod Impact, Notched, Joules/m[b] |
|---|---|
| Nylon 66[a] | 59 |
| Nylon 66 + 20% Copolymer[c] | 78 |
| Nylon 66 + 10% N-Containing Copolymer[d] | 157 |
| Nylon 66 + 20% N-Containing Copolymer[d] | NB(944)[e] |

[a]du Pont Zytel ® 101 nylon 66
[b]Izod Impact, ASTM D256
[c]Hydrogenated 41/59 butadiene/styrene copolymer
[d]Nitrogen-containing (0.14 weight percent N) hydrogenated 41/59 butadiene/styrene copolymer
[e]NB = no break; value in ( ) calculated from scale deflection.

The data in Table I show that the nitrogen-containing hydrogenated copolymer greatly enhances the impact strength, whereas in the absence of the grafted-nitrogen component, the hydrogenated copolymer only marginally alters the impact strength.

EXAMPLE II

This example is an inventive run demonstrating the effect a blend of butadiene/styrene (Bd/S) copolymers has on the impact resistance of a polyamide. The procedure described in Example I is repeated except a blend of two types of hydrogenated Bd/S copolymers were incorporated into the polyamide. These two hydrogenated copolymers are basically a 41 weight percent butadiene/59 weight percent styrene copolymer differing only in that one of the polymers is subsequently grafted with a nitro gen-containing compound. The total amount of copolymer incorporated in the polyamide is increased to 25 weight percent and the ratio of the two Bd/S copolymer ingredients in the blend is varied. These results which are listed in Table II show a significant increase in impact resistance with either Bd/S copolymer additive used singularly or as a mixture or blend of the copolymers. The data also indicate a better impact resistance when the nitrogen-containing Bd/S copolymer is used as the additive (Composition 8) compared to the non-nitrogen-containing additive (Composition 2). It is noteworthy that the highest impact resistance values were obtained where the ratio of the N-containing Bd/S copolymer:Bd/S copolymer was between 1:5:1 (Composition 6) and 4:1 (Composition 7) as compared with the lower value at a ratio of 0.67:1 (Composition 5). Thus if a combination of rubbers is used it is preferred to use them in a ratio of the N-containing:non-N-containing of at least about 1:1, with a preponderance of the N-containing (i.e. greater than 1:1) being most preferred. It is also noteworthy that the other performance values such as flexural modulus, flexural strength, etc. do not seem to be affected by the ratio variation of the two Bd/S copolymers.

TABLE II

Effect of a Nitrogen-Containing Hydrogenated Bd/S Copolymer on the Impact Resistance of a Polyamide (Zytel 101)

| | | Composition | | | | | | | |
|---|---|---|---|---|---|---|---|---|---|
| | | 1 | 2 | 3 | 4 | 5 | 6 | 7 | 8 |
| A | Composition, grams | | | | | | | | |
| | 1. Polyamide, Zytel 101[a] | 1000 | 750 | 750 | 750 | 750 | 750 | 750 | 750 |
| | 2. Bd/S Copolymer[b] | — | 250 | 200 | 0 | 150 | 100 | 50 | 0 |
| | 3. N-Containing Bd/S Copolymer[c] | — | — | 50 | 250[g] | 100 | 150 | 200 | 250 |
| | 4. Antioxidant, Irganox 1035[d] | — | — | 2.5 | 2.5 | 2.5 | 2.5 | 2.5 | 2.5 |
| | 5. Copolymer Nitrogen Content, wt. % | 0 | 0 | 0.018 | 0.03 | 0.036 | 0.054 | 0.072 | 0.09 |
| B | Performance Properties[e] | | | | | | | | |
| | 1. Flexular Modulus, MPa | 2473 | 1641 | 1617 | 1661 | 1650 | 1675 | 1686 | 1699 |
| | 2. Flexular Strength, MPa | — | 62 | 66 | 53 | 66.5 | 61.9 | 61 | 62.5 |
| | 3. Tensile Yield, MPa | 72 | 49.8 | 50.5 | 55.8 | 52.1 | 60.5 | 57.5 | 59.3 |
| | 4. Tensile Break, MPa | 63 | 41.8 | 44.7 | 43.1 | 42.7 | 47.2 | 46.5 | 46.2 |
| | 5. % Elongation | 190 | 33 | 47 | 29 | 48 | 32 | 39 | 30 |
| | 6. Izod Impact, Notched, J/m | 59 | 106 | 426 | 300 | 382 | (1170)[f] | (1190)[f] | (1120)[f] |

[a]Nylon 66 $M_n$ 13,500 from duPont
[b]Hydrogenated 41%/59% Bd/S random block of polymer containing no nitrogen.
[c]0.09 wt. % Nitrogen-containing hydrogenated 41%/59% Bd/S random block copolymer (U.S. Pat. No. 4,145,298).
[d]Calculation after dilution with Bd/S copolymer (footnote b) based on measured value of N-containing copolymer.
[e]Average of three runs.
[f]No break; value in ( ) calculated from scale deflection.
[g]N-containing copolymer with 0.03 wt. % N.

EXAMPLE III

The effect of incorporation of organic phosphites/phosphonates on the mechanical properties of Nylon 66 N-containing Bd/S copolymer blends is shown in Table III. The mixtures are prepared and processed as in Example I with these organophosphorus compounds replacing the thermal stabilizers. The notched Izod impact test was modified as follows: a thin slot was cut into the impact bar with a razor blade to a depth of a normal notched speciman and the bar so modified run in the normal procedure. These results are identified as "razor notch" Izod impact.

TABLE III

EFFECT OF PHOSPHITE AND PHOSPHONATE ON PROPERTIES

| Property | Organophosphorus Additive Present | | |
|---|---|---|---|
| | NONE[a] | TCP[b] | DMMP[c] |
| IZOD IMPACT | | | |
| Notched, J/m[d] | NB(1172) | NB(1204) | NB(1290) |
| Razor Notch, J/m | Brittle Failure[e] | NB(1178) | NB(1148) |
| Flexural Modulus, MPa | — | 1982 | 1860 |
| Tensile Yield, MPa | — | 67.3 | 67.7 |
| Tensile Break, MPa | — | 76.5 | 70.1 |
| Elongation, % | — | 116 | 169 |

[a]750 g Zytel 101, 250 g N-containing copolymer and 2.52 g Irganox ® 1035 in all three runs.
[b]TCP = Tris (2-chloroethyl) phosphite; TCP content of blend = 1% of copolymer present.
[c]DMMP = Dimethyl methylphosphonate; DMMP content of blend = 1% of copolymer present.
[d]see footnote f Table II.
[e]Brittle failure no value calculated, 5 of 10 specimens failed.

These data demonstrate that the presence of an organic phosphite or or phosphonate eliminates the sensitivity of the polyamide-N-containing copolymer blends to notch radius. In the absence of an organophosphorus additive the razor notch impact test gave brittle failure.

EXAMPLE IV

This example is an inventive run wherein the grafted nitrogen-containing polymer is added to another type polyamide, namely, a nylon 6 type polyamide. The procedure described in Example I is employed to prepare a blend containing 25 weight percent of the nitrogen-containing copolymer. The results are listed in Table IV wherein it can be seen that the nitrogen-containing copolymer greatly increases the notched Izod impact strength of the blend over that of the polyamide alone. Other performance properties tested show a slight decrease in values but none seem to be detrimental.

TABLE IV

IMPACT RESISTANCE OF POLYAMIDE (NYLON 6)

| | Composition | |
|---|---|---|
| | 1 | 2 |
| A. Composition, grams | | |
| 1. Polyamide, Fosta 512[a] | 1000 | 750 |
| 2. N-Containing Bd/S Copolymer[b] | — | 250 |
| 3. Antioxidant, Irganox 1035 | — | 2.5 |
| B. Performance Properties[c] | | |
| 1. Flexural Modulus, MPa | 2353 | 1643 |
| 2. Flexural Strength, MPa | 87 | 59.8 |
| 3. Tensile Yield, MPa | 66.6 | 47.9 |
| 4. Tensile Break, MPa | 56.3 | 42.7 |
| 5. % Elongation | 228 | 229 |
| 6. Izod Impact, Notched, J/m | 81 | 238 |

[a]Nylon 6, $M_n$ 24,100, from American Hoescht.
[b]0.14 Wt. % Nitrogen-Containing Hydrogenated 41%/59% Bd/S Random Block Copolymer (U.S. Pat. No. 4,145,298).
[c]Average of three runs.

EXAMPLE V

This Example shows the formation of an impact blend with a nylon formed by the polymerization of:
A. At least one compound of the general formula:

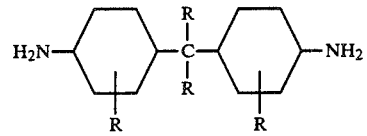

wherein each R is individually selected from the group consisting of —H and CH₃, and
B. At least one polycarboxylic acid having from 6 to 26 carbon atoms.

The results are shown hereinbelow in Table V.

TABLE V

Performance Properties For PACP-9/6 (60:40)[a] Plus Modifier Rubber Copolymer[b]

| Blend No. | Percent Rubber | Notched Izod Impact, J/m | Flexural Modulus, psig | Tensile Strength, psig | Percent Elongation |
|---|---|---|---|---|---|
| 1 | 0 | 37 | 1988 | 58 | 55 |
| 2 | 10 | 134 | 1778 | 56 | 9 |
| 3 | 20 | 131 | 1367 | 42 | 11 |

[a]Polyamide of 2,2-bis(4-aminocyclohexyl)propane with a mixture of azelaic acid (60 mole %) and adipic acid (40%) described in U.S. Pat. No. 4,028,476.
[b]A 0.14% nitrogen-containing polymer prepared by the reaction of lithiated hydrogenated conjugated diene/vinyl aromatic copolymer with nitrogen-containing organic compounds described in U.S. Pat. No. 4,145,298.

While this invention has been described in detail for the purpose of illustration it is not to be contrued as limited thereby but is intended to cover all changes and modifications thereof.

I claim:

1. A thermoplastic composition comprising:
   (a) a normally solid polyamide and
   (b) an oil-soluble organonitrogen compound grafted hydrogenated conjugated diene/monovinylarene copolymer having a polymerized monovinylarene content of about 20 to 70 weight percent with the proviso that when said copolymer contains a random block, the block polymonovinylarene content is in the range of 15 to 35 weight percent, the extent of hydrogenation of said copolymer being such that about at least 95 weight percent of olefinic double bonds have been saturated and less than about 5 weight percent of aromatic double bonds have been saturated, said copolymer characterized as having been prepared by the process which comprises metalating a hydrogenated conjugated diene hydrocarbon/mono-vinylarene hydrocarbon copolymer, and reacting the resulting metalated hydrogenated copolymer with effective amounts of at least one nitrogen-containing organic compound represented by the general formula X—Q—(NR₂³)ₙ or Y[Q—(NR₂³)ₙ]ₘ wherein each $R_2^3$ is the same or different alkyl, cycloalkyl, aryl, or combination thereof, Q is a hydrocarbon radical having a valence of n and is a saturated aliphatic, saturated cycloaliphatic, aromatic or combination radical, X is a functional group capable of reaction on a one-to-one basis with one equivalent of polymer lithium, n is at least one, and m is 2 or 3, thereby preparing said grafted copolymer,
   said polymer of (b) being present in an amount within the range of (1) 15 to 50 weight percent based on the total weight of composition if used alone, or (2) if the polymer of (b) is used in combination with another hydrogenated conjugated diene/-monovinylarene copolymer of the same type as that of (b) except for no organo-nitrogen compound being grafted thereto, the amount of the resulting combination is within the range of 20 to 50 weight percent based on the total weight of said composition, provided further that the amount of grafted copolymer when the polymers are used in combination times the weight percentage of nitrogen content equals at least 0.01 weight percent nitrogen based on the total weight of said thermoplastic composition.

2. A composition according to claim 1 wherein said conjugated diene is 1,3-butadiene and said monovinylarene compound is styrene.

3. A composition according to claim 1 wherein said polymer (b) is used alone and is present in an amount within the range of 20 to 25 weight percent.

4. A composition according to claim 3 wherein said copolymer contains nitrogen in an amount within the range of 0.05 to 0.5 weight percent.

5. A composition according to claim 1 wherein said copolymer of (b) is used in combination with a styrene-butadiene copolymer which is free of nitrogen.

6. A composition according to claim 3 wherein a ratio of said copolymer of (b) to said copolymer free of nitrogen is at least 1:1.

7. A composition according to claim 6 wherein said ratio is within the range of 1.5:1 to 4:1.

8. A composition according to claim 1 wherein said nitrogen-containing copolymer is prepared by reacting a styrene/butadiene copolymer with N,N-dimethylaminobenzaldehyde.

9. A composition according to claim 8 wherein said copolymer contains 0.05 to 0.5 weight percent nitrogen and is used alone in an amount within the range of 20 to 25 weight percent.

10. A composition according to claim 9 wherein said composition contains in addition 1 to 3 weight percent of a stabilizer selected from organophosphite compounds and organophosphonate compounds.

11. A composition according to claim 10 wherein said stabilizer is a dialkylphosphite.

12. A composition according to claim 11 wherein said dialkylphosphite is diisooctylphosphite.

13. A composition according to claim 1 wherein said composition contains in addition a stabilizer selected from organic phosphites and organic phosphonates.

14. A composition according to claim 13 wherein said stabilizer is an organic phosphite.

15. A composition according to claim 14 wherein said organic phosphite is a dialkylphosphite.

16. A composition according to claim 15 wherein said dialkylphosphite is diisooctylphosphite.

17. A composition according to claim 16 wherein said polyamide is nylon 66.

18. A composition according to claim 1 wherein said polyamide is nylon 66.

19. A composition according to claim 1 wherein said polyamide is made of 2,2-bis(4-aminocyclohexyl)propane and a 60/40 mole percent mixture of azelaic acid and adipic acid.

* * * * *